United States Patent
Edwards et al.

(10) Patent No.: US 9,381,552 B1
(45) Date of Patent: Jul. 5, 2016

(54) METHOD AND APPARATUS FOR RECOVERING SUBSURFACE FREE MERCURY AND DECONTAMINATING A SUBSTRATE

(71) Applicants: Gregory Edwards, Knoxville, TN (US); Louis Centofanti, Atlanta, GA (US); Daniel Centofanti, Dawsonville, GA (US)

(72) Inventors: Gregory Edwards, Knoxville, TN (US); Louis Centofanti, Atlanta, GA (US); Daniel Centofanti, Dawsonville, GA (US)

(73) Assignees: PERMA-FIX ENVIRONMENTAL SERVICES, INC., Atlanta, GA (US); Daniel Centofanti, Dawsonville, GA (US)

( * ) Notice: Subject to any disclaimer, the term of this patent is extended or adjusted under 35 U.S.C. 154(b) by 0 days.

(21) Appl. No.: 14/208,870

(22) Filed: Mar. 13, 2014

Related U.S. Application Data

(60) Provisional application No. 61/793,519, filed on Mar. 15, 2013.

(51) Int. Cl.
| | |
|---|---|
| *B09B 1/00* | (2006.01) |
| *B09C 1/00* | (2006.01) |
| *E21B 7/04* | (2006.01) |
| *E21C 25/66* | (2006.01) |
| *E21B 10/00* | (2006.01) |

(52) U.S. Cl.
CPC . *B09C 1/00* (2013.01); *B09C 1/002* (2013.01); *E21B 7/04* (2013.01); *E21B 10/00* (2013.01); *E21C 25/66* (2013.01); *B09C 2101/00* (2013.01)

(58) Field of Classification Search
USPC ................................................ 405/129.57
See application file for complete search history.

(56) References Cited

U.S. PATENT DOCUMENTS

| | | | | |
|---|---|---|---|---|
| 6,027,284 | A * | 2/2000 | Prasher et al. | 405/128.45 |
| 7,997,559 | B2 * | 8/2011 | Schauerte | 254/134.3 FT |
| 2003/0215290 | A1 * | 11/2003 | Cash | 405/128.5 |
| 2005/0207846 | A1 * | 9/2005 | Nickelson et al. | 405/128.5 |

FOREIGN PATENT DOCUMENTS

EP            0189158 A2 *   7/1986

* cited by examiner

*Primary Examiner* — John Kreck
(74) *Attorney, Agent, or Firm* — Dickinson Wright PLLC

(57) ABSTRACT

A method for preparing a contaminated structure comprising particulates for collection of one or more liquid contaminants, including:
drilling one more bore holes through the contaminated structure using one or more drill rods that remain within the bore hole;
attaching a horizontal soil cutting blade to one end of the one or more drill rods, wherein the horizontal soil cutting blade comprises a cutting portion and a non-cutting portion, and wherein the non-cutting portion has attached thereto an impermeable geotextile;
retrieving the one or more drill rods from the bore hole such that the cutting portion of the horizontal soil cutting blade is drawn through the contaminated structure creating a void therein, and such that the impermeable geotextile is drawn through the void; and
introducing a contaminant collection apparatus at or along one edge of the impermeable geotextile, such that an upper surface of the impermeable geotextile is in fluid communication with the contaminant collection apparatus.

5 Claims, 4 Drawing Sheets

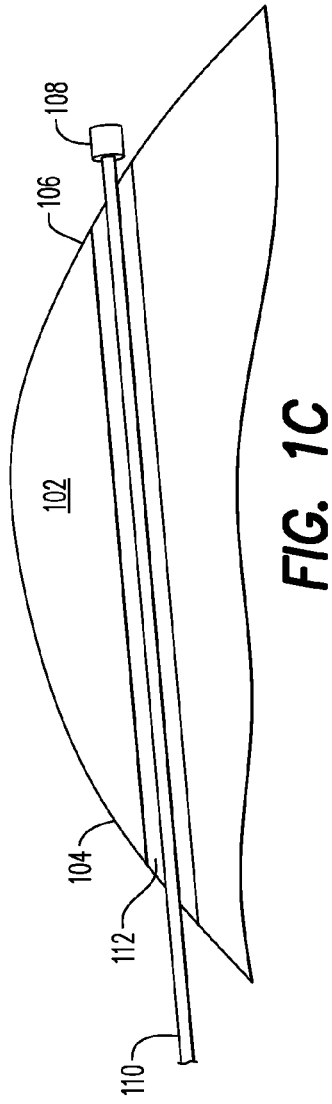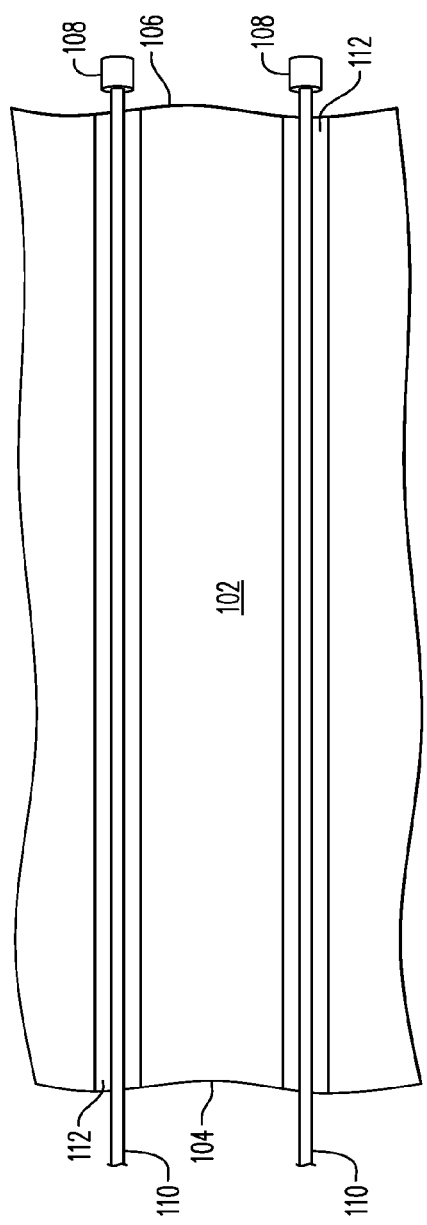

METHOD AND APPARATUS FOR RECOVERING SUBSURFACE FREE MERCURY AND DECONTAMINATING A SUBSTRATE

BACKGROUND

1. Field

Disclosed herein are methods and apparatus for removing elemental mercury and/or other liquid contaminants from a geological subsurface substrate or formation by mobilizing and passively collecting the mercury and/or other liquid contaminants through, e.g., a soil column, and collecting it in pipes and sumps.

2. Description of Related Art

Mercury is a silver-white, heavy liquid at room temperature that forms small, compact droplets when released into the environment. The mercury in these droplets contains a high vapor pressure, causing it to evaporate and become easily inhalable. Contamination of soil and subsurface geological formations by elemental mercury may result from past use of a particular site for a variety of industrial uses, such as mining and smelting, burning of fossil fuels, industrial production of caustic, waste incineration, pharmaceutical production, etc. Mercury is often encountered in such environments in elemental form.

Because mercury, and in particular, elemental mercury, is considered to be a hazardous material that is easily absorbed by inhalation, as well as leachable into groundwater, and because mercury can potentially cause harmful effects to the central nervous system, kidney toxicity, etc., its presence in the soil of sites to be used by humans is generally undesirable, and has been subject to environmental regulatory control. One hundred seventy three Superfund Sites list mercury as a contaminant of concern in the soil of the site. Nonlisted wastes are defined as hazardous wastes if the concentration of mercury in the waste extract exceeds 0.2 mg/L using the Toxicity Characteristic Leaching Procedure (TCLP) under the toxicity criteria of the Resource Conservation and Recovery Act (RCRA). The U.S. Environmental Protection Agency has set a Land Disposal Restriction (LDR) standard for mercury contamination in soil that requires treatment to reduce by 90% of the original concentration of mercury in the soil, or to a level of 2.0 mg/L using the TCLP procedure. See Treatment Technologies for Mercury in Soil, Waste, and Water, U.S. Environmental Protection Agency, Office of Superfund Remediation and Technology Innovation, August, 2007, incorporated herein by reference.

Accordingly, several techniques have been developed in attempts to remediate soil or other particulate material that has been contaminated by mercury or other contaminants. These include solidification/stabilization, where the contaminant is physically bound or enclosed within a stabilized mass, and thereby converted into a less soluble, less mobile form. Another technique is soil washing/acid extraction, which involves suspending soil in a wash solution and separating the fine particulates therefrom. Contaminants that preferentially sorb onto the fines can be separated from the suspension, thereby reducing the concentration of the contaminant in the remaining soil. This procedure may involve the contacting of the soil with an extracting chemical, such as hydrochloric or sulfuric acid. Another technique is thermal desorption/retorting, which involves the application of heat and/or reduced pressure to volatilize mercury or other contaminant from the soil, and collection of the vaporized contaminant by condensation. Additional scrubbing processes may be needed to treat off-gas resulting from this technique. Finally, vitrification is a high temperature treatment to reduce the mobility of contaminants by incorporation into a chemically durable, leach-resistant vitreous mass.

Each of these techniques has the drawback that it is relatively complex and expensive. Since liquid contaminants like elemental mercury can penetrate to a significant depth below the surface in the soil of a contaminated site, these techniques require the removal and processing of significant volumes of soil. Some of the techniques, such as soil washing/acid extraction, is primarily used to treat soils with low clay content, and which can be separated into a highly contaminated fines fraction and a less contaminated sands fraction. Thermal desorption/retorting is also not suitable for soils with high clay content, and requires additional processing to deal with the off-gases produced. Both of these techniques require removal of the soil from the site of the contamination. Solidification/stabilization and vitrification both change the nature and character of the soil that has been contaminated, rather than simply decontaminating it, and result in a significant volume of material that must be disposed of in a landfill. All of these procedures are capital intensive. Accordingly, there remains a need in the art for an inexpensive, simple method for removing mercury and/or other liquid contaminants from soil or other solid particulate materials.

In addition, the identification of the site of contamination, and thus the location where remediation efforts are most likely to be valuable, can be difficult, sometimes requiring analysis of samples of soil and other materials for the presence of mercury, which can be time consuming and expensive. Accordingly, there remains a need in the art for an inexpensive, fast, reliable method for determining the presence of mercury in soil and subsurface structures.

SUMMARY

The methods and apparatus disclosed herein provide such a method. The methods and apparatus disclosed herein provide for collection of free phase elemental mercury from the subsurface of a contaminated site. The methods and apparatus assist in the mobilization and collection of free mercury by allowing it to mobilize through the soil column and be collected in pipes and sumps.

In one embodiment disclosed herein, there is a method for removing elemental mercury or other liquid contaminant from a collection of particulate material, such as subsurface soil, particulate waste, etc. that involves installing a vertical well with perforated or slotted well screen, or installing a horizontal well with a specially designed well screen with a slotted upper half and solid lower half, that will allow the passive collection and gravity drainage of free mercury into a collection sump for collection and removal.

In another embodiment disclosed herein, there is a method for recovering a liquid contaminant from a collection of particulate material, such as subsurface soil, particulate waste, etc. that involves drilling two horizontal borings and, if necessary, reaming them out to appropriate size, using two drill bits removably affixed to each end of a drill rod; removing the drilling bits on the far end of the borehole, e.g, by bringing them back to the surface there, and installing a horizontal soil cutting blade, having an impermeable geomembrane connected thereto on a noncutting end thereof, on each end of the drill rods; retrieving the drill rods and horizontal soil cutting blade through the soil, thereby cutting a void in the soil between the two drill rods and pulling the geomembrane through the void left by the horizontal soil cutting blade. This process installs an impermeable geomembrane horizontally in the formation. The drill holes are placed and oriented to allow mercury or other liquid contaminant collected on the geomembrane to flow under the influence of gravity to one or more collection sumps for collection and removal.

In another embodiment disclosed herein, there is a soil cutting blade that creates a horizontal void in soil to facilitate the installation of a geotextile, having a hardened steel cutting portion connecting to each end of two horizontally installed drill rods and facing a drill rod retrieval direction, whereby the cutting portion cuts an opening in the soil as the drill rods are retrieved through boreholes, and having a non-cutting portion to which an impermeable geomembrane is attachable.

In another embodiment disclosed herein, there is mercury collection equipment containing innovative components designed to facilitate the recovery process. Components of the system include collection sumps, collection piping, geotextile/pipe configuration, geotextile/pipe layout, and appurtenances. The system layout is desirably oriented for the passive downhill flow of free mercury to the collection sumps. The impermeable geotextile is desirably sloped towards and connected to the collection piping, which in turn is sloped towards the collection apparatus and sumps. The sumps can be connected to vertically drilled wells. In a particular embodiment, the geotextile can contain a collection grid and permeable layer on the upper surface to allow free movement of mercury across the permeable membrane. Collection sumps allow accumulation and collection of the free mercury.

In another embodiment disclosed herein, there is a soil flushing process that mobilizes free mercury in the soil column. The flushing can include a hydraulic, steam, and/or chemical process to augment mobilization of free mercury to the collection system. Horizontal wells can be used to inject the appropriate media for site conditions, which media reacts or contacts the free mercury, thus enhancing its mobilization toward the geotextile.

In another embodiment disclosed herein, there is a physical mobilization process that utilizes vibratory and/or ultrasonic methods to augment mobilization of free mercury in the soil column. The physical process of standard vibration and/or ultrasonic vibration assists the recovery of free mercury that may be tied up in tight or impermeable soils, and utilizes surface and subsurface methods.

In another embodiment disclosed herein, there is a hydraulic/pneumatic fracturing process that utilizes downhole methods to increase pore space in the soil formation and increase mobilization of mercury to the collection system. The process involves drilling and applying high pressure water or air to open up voids and increase pore space in the formation.

In another embodiment disclosed herein, there is a method for determining the likely presence of mercury in potentially contaminated soil or subsurface structures by exposing the potentially contaminated structure to one or more geophysical evaluation methods selected from the group consisting of ground penetrating radar, seismic waves, induced magnetic fields, and very low frequency (VLF) waves, receiving the response of an area of the structure to this exposure, and evaluating this response to determine the likelihood of the presence of mercury.

BRIEF DESCRIPTION OF DRAWINGS

The invention disclosed and claimed herein can be better understood by reference to the drawing figures described below, which are intended to illustrate, and not to limit, the invention.

FIG. 1C is a schematic elevation view, in cutaway, of the first embodiment after drilling;

FIG. 1D is a schematic plan view, in cutaway, of the first embodiment after drilling;

DETAILED DESCRIPTION OF SPECIFIC EMBODIMENTS

To further explain the nature of the invention disclosed herein, several specific embodiments are described below. These embodiments are intended to illustrate the nature of the invention, rather than to limit the scope of the appended claims.

As used herein, the term "horizontal" or "substantially horizontal" as used to refer to directions and surfaces denotes a non-vertical direction or surface, and is not intended to be restricted to surfaces that are perpendicular to a plumb line or strictly horizontal with respect to a spirit level. Similarly, the term "vertical" or "substantially vertical" includes directions that are not horizontal, but that are also not strictly parallel to a plumb line.

Figure 1A:
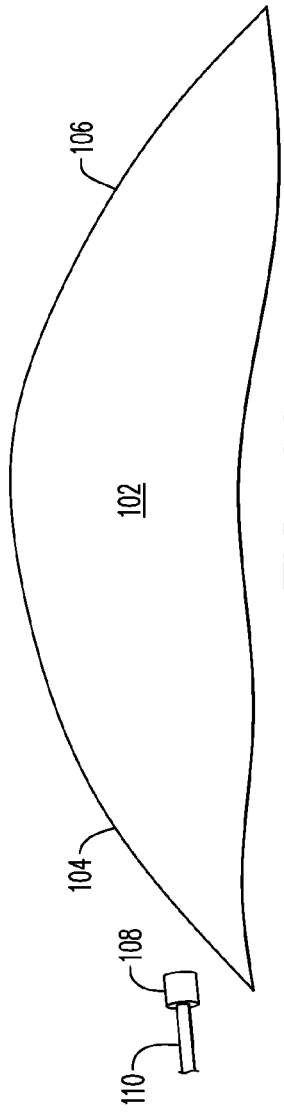
FIG. 1A is a schematic elevation view of a first embodiment of a method and apparatus disclosed herein, prior to drilling.
Figure 1B:
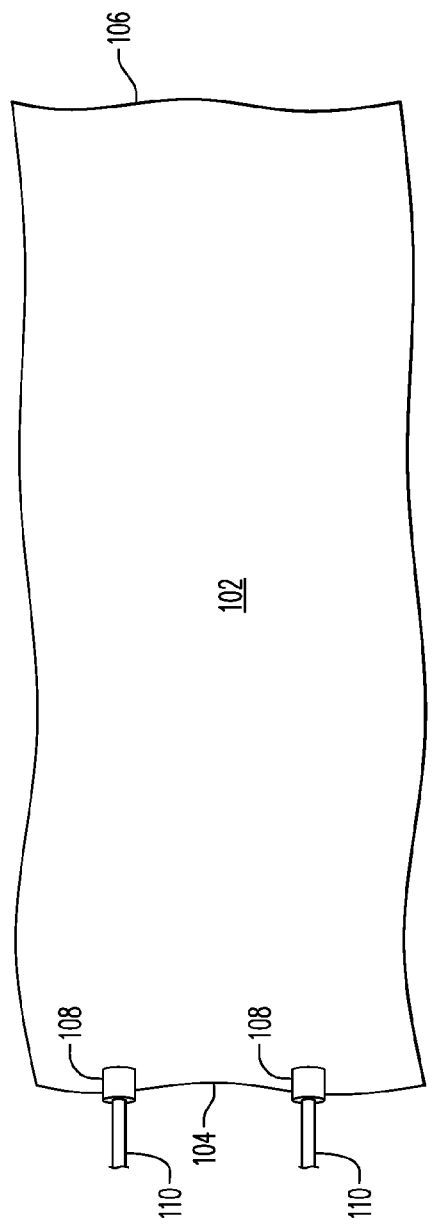
FIG. 1B is a schematic plan view of the first embodiment after drilling.

One embodiment of a method for removing mercury and other liquid contaminants from a subsurface structure is illustrated schematically with respect to certain of its steps in FIG. 1A-1G. FIG. 1A illustrates schematically the situation just prior to drilling. Contaminated (or potentially contaminated) structure 102 contains a first surface 104, where drilling will commence, and a second surface 106, where drill bits 108 will be re-surfaced and recovered after drilling. First surface 104 and second surface 106 may be contiguous, or may be separate surfaces. Drill bits 108 (only one of which is visible in FIG. 1A) are removably attached to drill rods 110. While contaminated structure 102 is shown as a mound of material for ease of illustration, it will be understood that such a geometry is not necessary, and that any collection of particulates, such a soil, may be suitably treated by the disclosed method. FIG. 1B shows a plan view corresponding to the elevational view of FIG. 1A, and more clearly illustrates the presence of two drill bits 108 and drill rods 110.

FIG. 1C and FIG. 1D provide elevational and plan views, respectively, of the situation after drilling has been carried out. Drill bits 108 have created bore holes 112 in contaminated structure 102, and have been re-surfaced from contaminated structure 102 on second surface 106. As illustrated in FIG. 1C, these bore holes 112 can be, and desirably are at an angle to the horizontal so that they can provide a gradient for liquid to flow in a desired direction, in this case, toward first surface 104. At this point in the process, drill rods 110 remain in drill bore holes 112.

Figure 1E:
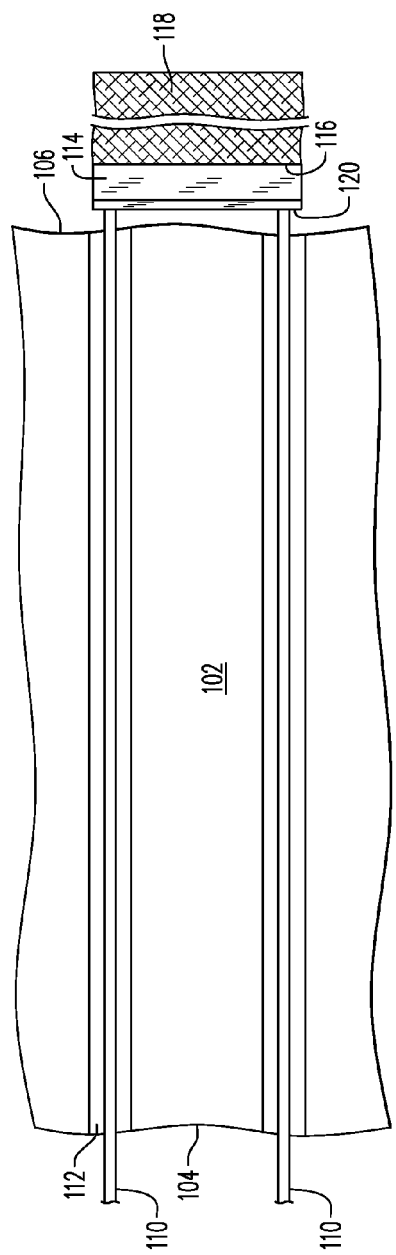
FIG. 1E is a schematic plan view of the first embodiment after removal of the drilling bits and attachment of the horizontal soil cutting blade and impermeable geomembrane.

FIG. 1E schematically illustrates the situation after drilling, re-surfacing, and removal of the removably attached drill bits 108 and after attachment of horizontal soil cutting blade 114 to drill rods 110. Horizontal soil cutting blade 114 has a non-cutting end 116, which is removably attachable to an impermeable geotextile 118, and a cutting end 120. Drill rods 110 are attachable to horizontal soil cutting blade 114 at the cutting end 120, the noncutting end 116, or at a point between these. Attachment of the drill rod ends may be by techniques known in the art, such as bolting, riveting, swaging, temporary welding, or other techniques. Following attachment of horizontal soil cutting blade 114 to drill rods 110, the drill rods are retrieved by withdrawing them toward first surface 104. This draws the horizontal soil cutting blade 114 through the contaminated structure 102, creating a void therein, through which is drawn the impermeable geotextile 118. In the embodiment illustrated, the horizontal soil cutting blade 114 is shown to have a transverse dimension roughly equal to the diameter of the bore holes 112 plus the distance between them. However, it will be appreciated that the transverse dimension of the horizontal soil cutting blade 114 and/or that of impermeable geotextile 118 need not be so limited, and may extend beyond the bore holes 112 for some distance. Moreover, more than two bore holes may be drilled using additional drill rods and drill bits, which can provide additional points of attachment to horizontal soil cutting blade 114.

Figure 1F:
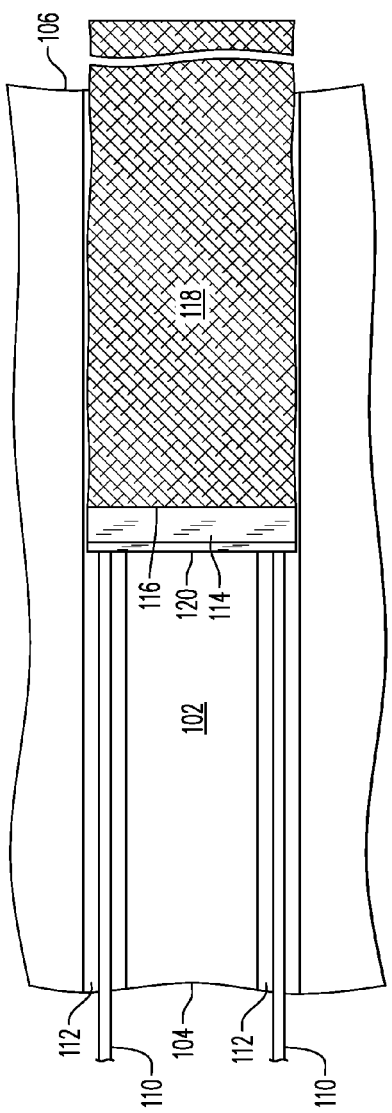
FIG. 1F is a schematic plan view of the first embodiment after partial retrieval of drill rods, and partial cutting of a void in the soil and installation of the impermeable geomembrane.

The process of retrieving of the drill rods 110 and movement through the contaminated structure 102 of the horizontal soil cutting blade 114 is illustrated in FIG. 1F, which shows schematically the situation after partial retrieval. As the horizontal soil cutting blade 114 is moved through the contaminated structure 102, it creates a void which is then at least partially filled with impermeable geotextile 118, which is desirably at an angle such that any liquid which impinges on the geotextile from the soil or other particulates disposed above it will flow under the influence of gravity in a desired direction. After installation of the impermeable geotextile 118 and any other necessary or desirable collection equipment, the bore holes 112 and any remaining void space need not be maintained, and may be allowed to collapse if desired. An example of such an arrangement is shown schematically in FIG. 1G, which shows impermeable geotextile 118 in fluid communication with vertical well 122 at the edge 128 of impermeable geotextile 118, which in turn communicates with collection sump 124. Liquid contaminants, such as elemental mercury, can flow under the influence of gravity, or assisted by a soil flushing process to mobilize the contaminant in the soil, through contaminated structure 102 until the contaminant encounters the impermeable geotextile 118. The contaminant then flows along the impermeable geotextile 118 toward first surface 104, and is collected by vertical well 112 and caused to flow into collection sump 124. Collection sump 124 may be continuously or periodically emptied via removal conduit 126.

Alternatively, depending upon the geometry of the contaminated structure 102 and/or other factors, it may be desirable to attach the horizontal soil cutting blade to the drill rods at first surface 104, and draw the impermeable geotextile through the contaminated structure 102 toward second surface 106.

The impermeable geotextile may be any material that is impermeable to liquids, stable to the liquid contaminants expected to be encountered (such as elemental mercury), and stable to soil chemistry or other chemistry expected to be encountered in the contaminated structure. Suitable geotextiles include polymeric sheets, such as polyurethanes, polyesters, polyolefins, and the like. Generally, an extruded sheet is preferable to woven or nonwoven sheets, as extruded sheets tend to have better liquid impermeability. The impermeable geotextile may be attached to the noncutting portion of the horizontal soil cutting blade by any appropriate art-recognized method, such as clamping, bolting, stapling, and the like.

Figure 2:
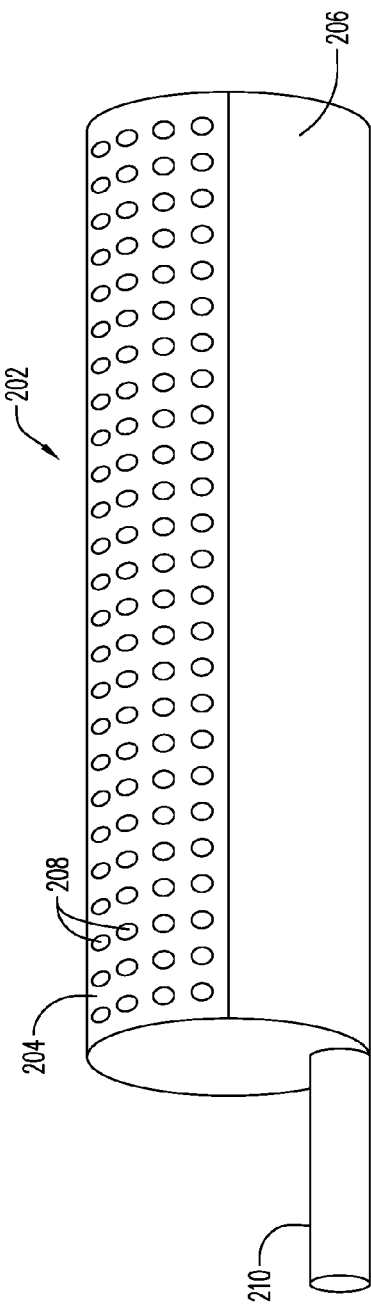
FIG. 2 is a schematic view of an embodiment of a collection apparatus disclosed herein.

Another embodiment disclosed herein is a horizontal collection apparatus shown in FIG. 2. Such an apparatus may be installed in a bore hole 112 prepared in contaminated structure 102 as described above. In FIG. 2, collection apparatus 202 is illustrated as a cylindrical collection conduit having an upper portion 204 and a lower portion 206, wherein some or all of the upper portion contains one or more perforations or openings 208 in fluid communication with the inside space of the conduit. The lower portion 206 does not contain such perforations or openings. When installed in a contaminated structure 102, liquid contaminant flows from the portion of the contaminated structure above the collection apparatus 202 and through perforations 208 into the inside of the collection apparatus 202, and collects in the lower portion 206. Thereafter, gravity flow causes the collected liquid contaminant to move toward removal conduit 210.

Figure 1G:
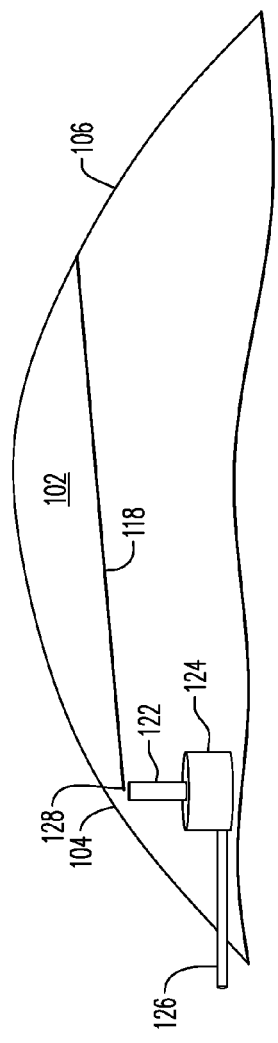
FIG. 1G is a schematic plan view of the first embodiment after installation of the impermeable geomembrane and suitable collection apparatus.

In another embodiment, the collection apparatus 202 can be used in conjunction with the method described above with respect to FIG. 1A-1G. Rather than install a vertical well 122 as shown in FIG. 1G, the edge 128 of impermeable geotextile 118 can be in fluid communication with one or more perforations 208 of collection apparatus 202. Desirably, collection apparatus 202 can be installed such that there is a gradient that creates fluid flow toward removal conduit 210, which may require that one end of the collection apparatus 202 be higher than the end containing removal conduit 210. This may, in turn, require that bore holes 112 be drilled at different relative heights, so that impermeable geotextile 118 will have a gradient in two mutually transverse directions, or that some other geometry be used to create the desired flow characteristics.

As indicated above, the mobility of liquid contaminants toward the impermeable geotextile or toward the collection apparatus may be improved by using soil flushing of the contaminants with water, steam, or reactive chemicals, such as acids or bases, or by using ultrasonic or other vibratory techniques to loosen the soil or other particulates in the contaminated structure, and propel liquid through it. Hydraulic or pneumatic fracturing may be used in the alternative, or in addition to, these techniques to increase pore space in the contaminated structure and increase liquid mobility through it.

In another embodiment of a collection apparatus, a vertical well having a perforated or slotted screen can be installed in the contaminated structure, so that liquid contaminants flow through the perforations or slots and are channeled into a collection sump.

In another embodiment, there is disclosed a method for determining the likely presence of mercury in potentially contaminated soil or subsurface structures by exposing the potentially contaminated structure to one or more geophysical evaluation methods. Typical suitable geophysical evaluation methods include those selected from the group consisting of ground penetrating radar, seismic waves, induced magnetic fields, and very low frequency (VLF) waves, each of which is known in the art for use in evaluating subsurface structures, although not for the presence of mercury. The exposure of the potentially contaminated structure to emissions, such as waves or energy, from these methods generates a response in the structure which can be received by a suitable detector according to techniques known in the art. This response can be evaluated to determine the likelihood of the presence of mercury in the structure, e.g., by the use of suitable electronics and filter circuits to identify materials having characteristics matching collections of mercury in amounts sufficient to warrant remediation or removal. Alternatively, signal processing software can be used to assess the signal returning from the potentially contaminated structure for characteristics indicative of mercury (e.g., density, etc.). The results of this assessment can be used to target efforts at remediation to where they are most needed and cost effective.

The invention having been described above with respect to certain specific embodiments and examples, it will be understood that these specific embodiments and examples are illustrative of, and not intended to limit the scope of, the appended claims.

What is claimed is:

1. A method for preparing a contaminated structure comprising particulates for collection of one or more liquid contaminants, comprising:
   drilling one more bore holes through the contaminated structure using one or more drill rods that remain within the bore hole;
   attaching a horizontal soil cutting blade to one end of the one or more drill rods, wherein the horizontal soil cutting blade comprises a cutting portion and a non-cutting portion, and wherein the non-cutting portion has attached thereto an impermeable geotextile;
   retrieving the one or more drill rods from the bore hole such that the cutting portion of the horizontal soil cutting blade is drawn through the contaminated structure creating a void therein, and such that the impermeable geotextile is drawn through the void; and
   introducing a contaminant collection apparatus at or along one edge of the impermeable geotextile, such that an upper surface of the impermeable geotextile is in fluid communication with the contaminant collection apparatus.

2. A method for collecting and removing one or more liquid contaminants from a contaminated structure comprising particulates, comprising:
   preparing the contaminated structure according to the method of claim 1;
   causing liquid contaminants to flow through the contaminated structure to the upper surface of the impermeable geotextile, and along this upper surface to the contaminant collection apparatus;
   collecting liquid contaminants in the contaminant collection apparatus; and
   removing the collected liquid contaminants from the contaminant collection apparatus for disposal or reuse.

3. The method according to claim 2, wherein the liquid contaminant comprises elemental mercury.

4. The method according to claim 2, wherein the contaminated structure comprises soil.

5. The method according to claim 2, further comprising increasing mobility of the liquid contaminant by one or more of hydraulic soil flushing, steam soil flushing, chemical soil flushing, non-ultrasonic vibration, ultrasonic vibration, hydraulic fracturing, or pneumatic fracturing.

* * * * *